United States Patent
Bonanno et al.

(10) Patent No.: US 10,423,420 B2
(45) Date of Patent: *Sep. 24, 2019

(54) STREAM BASED BRANCH PREDICTION INDEX ACCELERATOR FOR MULTIPLE STREAM EXITS

(71) Applicant: INTERNATIONAL BUSINESS MACHINES CORPORATION, Armonk, NY (US)

(72) Inventors: James J. Bonanno, Wappingers Falls, NY (US); Michael J. Cadigan, Jr., Poughkeepsie, NJ (US); Adam B. Collura, Hopewell Junction, NY (US); Daniel Lipetz, Linden, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,681

(22) Filed: Mar. 1, 2017

(65) Prior Publication Data

US 2017/0371672 A1 Dec. 28, 2017

Related U.S. Application Data

(63) Continuation of application No. 15/193,297, filed on Jun. 27, 2016.

(51) Int. Cl.
*G06F 9/38* (2018.01)

(52) U.S. Cl.
CPC .......... *G06F 9/3806* (2013.01); *G06F 9/3848* (2013.01)

(58) Field of Classification Search
None
See application file for complete search history.

(56) References Cited

U.S. PATENT DOCUMENTS

| 5,507,028 A * | 4/1996 | Liu ................. G06F 9/3806 712/207 |
| 2010/0031010 A1* | 2/2010 | Moyer ............. G06F 9/3806 712/238 |

OTHER PUBLICATIONS

List of IBM Patents or Patent Applications Treated as Related, U.S. Appl. No. 15/446,681, filed Mar. 1, 2017, 2 Pages.
(Continued)

*Primary Examiner* — John M Lindlof
(74) *Attorney, Agent, or Firm* — Cantor Colburn LLP; William Kinnaman

(57) ABSTRACT

A computer-implemented method for predicting a taken branch that ends an instruction stream in a pipelined high frequency microprocessor includes receiving, by a processor, a first instruction within a first instruction stream, the first instruction comprising a first instruction address; searching, by the processor, an index accelerator predictor one time for the stream; determining, by the processor, a prediction for a taken branch ending the branch stream; influencing, by the processor, a metadata prediction engine based on the prediction; observing a plurality of taken branches from the exit accelerator predictor; maintaining frequency information based on the observed taken branches; determining, based on the frequency information, an updated prediction of the observed plurality of taken branches; and updating, by the processor, the index accelerator predictor with the the updated prediction.

3 Claims, 9 Drawing Sheets

(56) References Cited

OTHER PUBLICATIONS

U.S. Appl. No. 15/193,297, filed Jun. 27, 2016; Entitled: Stream Based Branch Prediction Index Accelerator for Multiple Stream Exits; First Named Inventor: James J. Bonanno.
U.S. Appl. No. 15/193,304, filed Jun. 27, 2016; Entitled: Stream Based Branch Prediction Index Accelerator With Power Prediction; First Named Inventor: James J. Bonanno.

* cited by examiner

FIG. 3

STREAM BASED BRANCH PREDICTION INDEX ACCELERATOR FOR MULTIPLE STREAM EXITS

PRIORITY

This application is a continuation of U.S. Non-Provisional Application Ser. No. 15/193,297, entitled "STREAM BASED BRANCH PREDICTION INDEX ACCELERATOR FOR MULTIPLE STREAM EXITS", filed Jun. 27, 2016, having all the benefits accruing therefrom under 35 U.S.C. § 119, the contents of which in their entirety are herein incorporated by reference.

BACKGROUND

The present disclosure relates to the field of microprocessor design, and more specifically, to stream based lookahead branch prediction for multiple stream exits.

Branch prediction is a performance-critical component of a pipelined high frequency microprocessor. It is used to predict the direction (taken vs. not taken) and the target address of each branch instruction. This is beneficial because it allows processing to continue along a branch's predicted path rather than having to wait for the outcome of the branch to be determined. A penalty is incurred if a branch is predicted incorrectly. Pipelined branch predictor takes several cycles to make a prediction.

Traditionally, branch prediction is used to steer the flow of instructions down a processor pipeline along the most likely path of code to be executed within a program. Branch prediction uses historical information to predict whether or not a given branch will be taken or not taken, such as predicting which portion of code included in an IF-THEN-ELSE structure will be executed based on which portion of code was executed in the past. The branch that is expected to be the first taken branch is then fetched and speculatively executed. If it is later determined that the prediction was wrong, then the speculatively executed or partially executed instructions are discarded and the pipeline starts over with the instruction proceeding the branch with the correct branch path, incurring a delay between the branch and the next instruction to be executed.

To accelerate speculative searching and efficiently power up structures, it would be advantageous to predict where a stream ends, where it goes and include information about the next stream. Rather than making a branch prediction for each search, it may also be advantageous to make the prediction based on the start of the data stream, and make one entry per stream rather than one entry per search. It may also be advantageous to identify the most common exit point from a branch prediction stream and uses that exit point as the column prediction, which may achieve even more efficiency for the column predictor, and thus increase performance as branch predictions are accelerated whenever the column predictor is correct.

SUMMARY

According to one embodiment, a computer-implemented method for predicting a taken branch that ends an instruction stream in a pipelined high frequency microprocessor includes receiving, by a processor, a first instruction within a first instruction stream, the first instruction comprising a first instruction address; searching, by the processor, an index accelerator predictor one time for the stream; determining, by the processor, a prediction for a taken branch ending the branch stream; influencing, by the processor, a metadata prediction engine based on the prediction; observing a plurality of taken branches that end the instruction stream; maintaining frequency information based on the observed taken branches; determining, based on the frequency information, an updated prediction of the observed plurality of taken branches; and updating, by the processor, the index accelerator predictor with the the updated prediction.

According to another embodiment, a system for predicting a taken branch that ends an instruction stream in a pipelined high frequency microprocessor includes a processor configured to: receive a first instruction within a first instruction stream, the first instruction comprising a first instruction address; search an index accelerator predictor one time for the stream; determine a prediction for a taken branch ending the branch stream; influence a metadata prediction engine based on the prediction; observe a plurality of taken branches that end the instruction stream; maintain frequency information based on the observed taken branches; determine, based on the frequency information, an updated prediction of the observed plurality of taken branches; and update the index accelerator predictor with the the updated prediction.

According to yet another embodiment, a computer program product for predicting a branch in an instruction stream in a pipelined high frequency microprocessor is described. The computer program product includes a computer readable storage medium having program instructions embodied therewith, wherein the computer readable storage medium is not a transitory signal per se. The program instructions are executable by a processor to cause the processor to perform a method. The method receiving, by the processor, a first instruction within a first instruction stream, the first instruction comprising a first instruction address; searching, by the processor, an index accelerator predictor one time for the stream; determining, by the processor, a prediction for a taken branch ending the branch stream; influencing, by the processor, a metadata prediction engine based on the prediction; observing a plurality of taken branches that end the instruction stream; maintaining frequency information based on the observed taken branches; determining, based on the frequency information, an updated prediction of the observed plurality of taken branches; and updating, by the processor, the index accelerator predictor with the the updated prediction.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 is a block diagram depicting the structure of the branch target buffer and branch target buffer column predictor of FIG. 1, for predicting the presence, and target location of a branch, in accordance with an embodiment of the present invention;

DETAILED DESCRIPTION

Figure 1:
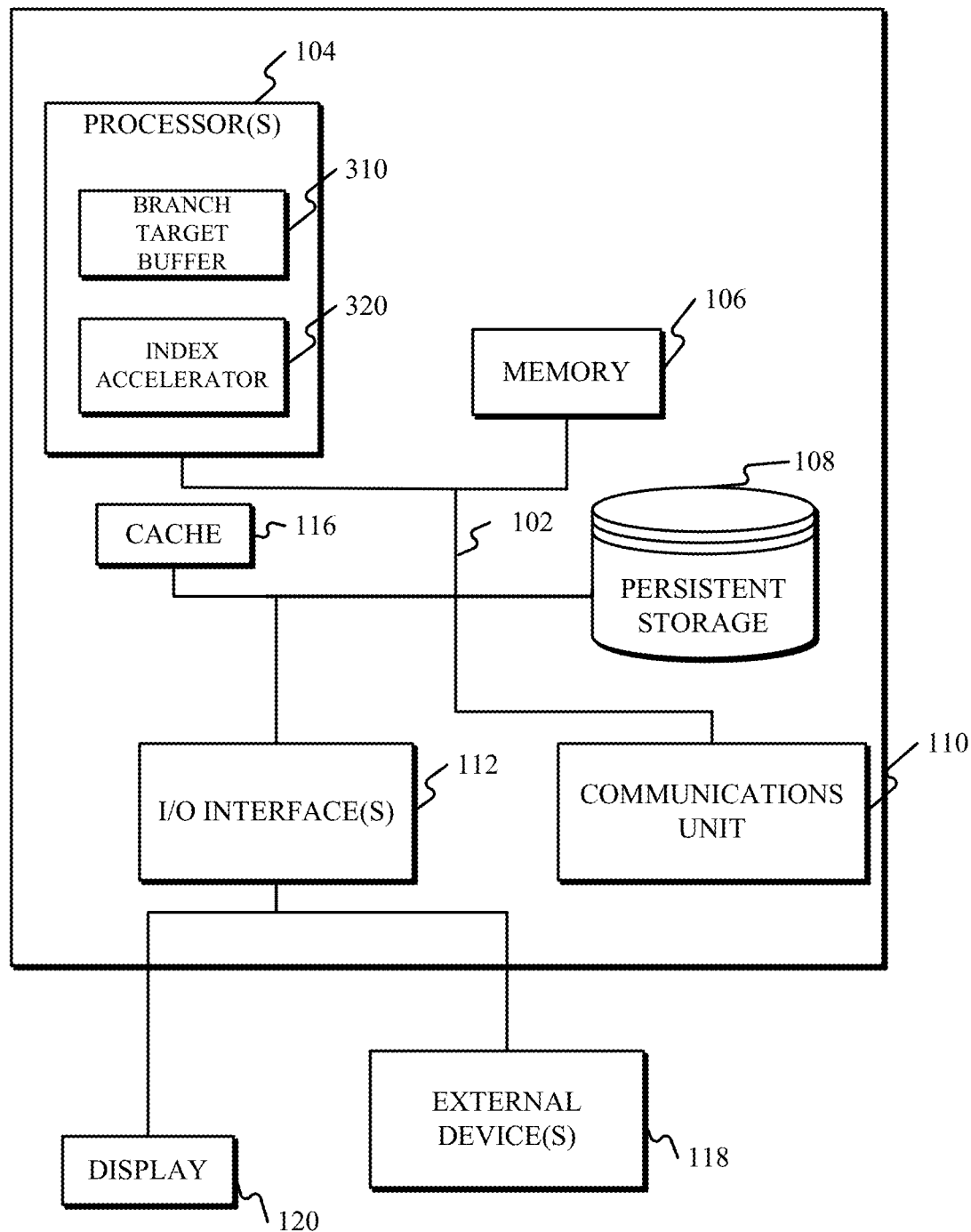
FIG. 1 is a block diagram of components of the computing device including the branch target buffer column predictor and branch target buffer, in accordance with an embodiment of the present invention.

A Branch Target Buffer (BTB) is a structure that stores branch and target information. BTBs cache branch information and in many ways are analogous to instruction and data caches. Branch History Tables (BHTs) and Pattern History Tables (PHTs) are additional structures that can store additional information used for branch direction. A BHT or PHT usually uses saturating counters as a state machine to predict the direction of branches. A BHT is indexed and tagged based on instruction address of the branch itself. A PHT is indexed based on the path taken to get to the branch. It may or may not contain instruction address and/or path history tags. Usually each table entry is a 2-bit saturating counter, but other sizes are also possible. It attempts to learn the dominant behavior of a branch, or multiple branches mapping to the same table entry, and predicts that direction. A BTB and BHT can be combined with one or more tagged PHTs. The TAGE predictor combines multiple PHTs, each indexed with different history lengths. Perceptron branch predictors are simple artificial neural networks that predict a branch's direction by learning correlations between bits in a global direction history vector and the branch outcome.

Asynchronous, lookahead branch prediction is done asynchronously from the main processor pipeline which begins with instruction fetching. Upon being restarted at a specified instruction address at the same time frame as instruction fetching, branch prediction independently searches the BTB for the first branch at or after the restart address. Upon finding a branch, the branch prediction logic reports it to the instruction fetching logic and to the pipeline logic to allow eventual correlation between branch predictions and instructions being decoded. Independently from the rest of the pipeline, the branch prediction logic re-indexes itself with the predicted target address of a predicted taken branch. For a predicted not-taken branch it continues searching sequentially. It then looks for the next branch. This process then repeats. Indexing branch predictors, reading content from them, and determining whether or not there is a predicted taken branch and if so its target address takes multiple processor cycles in modern high frequency designs. Conventional methods have shown that it is beneficial to speculatively re-index when it is likely the process will find a taken branch prior to actually finding one.

For a cache structure that supports N set associativity, effort must be incurred to perform tag matching against all sets to determine which of the N sets to select. In modern microprocessors, this effort usually incurs a couple of clock cycles to compute. Methods such as set prediction have been exploited to make an educated guess which of the N sets is going to have a successful tag match, based on previous history of the executing code.

Branch prediction, which attempts to find the location of branches in an instruction stream being executed by a processor in an effort to avoid costly branch wrong restart penalties, can also exploit a set associative cache structure typically called a branch target buffer (BTB). A stream is defined as a sequence of instructions ending with a taken branch. This invention adds the Stream-based index accelerator PREDictor (SPRED). It is indexed with the starting instruction address (IA) of a stream. Each set hit in the BTB would indicate the location of a branch within a particular section of code, its direction and predicted target address; set selection is utilized to determine which of the N sets to select. Sets in branch prediction are sometimes referred to as columns. The rate at which branch predictions can be made can be accelerated by using a set, or column predictor, which predicts which of the N columns in the BTB is expected to be used and then used speculatively.

The BTB is generally indexed using an instruction address and is incremented by a certain amount to continue searching sequentially for branches within a region of code. Each time the processor instruction stream is restarted, such as for a wrong branch, searching starts and a new stream is started. Therefore, each predicted taken branch starts a new stream.

The branch predictor could also have knowledge as to where the taken branch is within the current stream. For instance, each BTB search could examine an address space of a double quadword ($2^6$ bytes) per cycle. The predictor could know that the taken branch that ends the current stream is k double quadwords (DQW) from the start of the stream. This taken branch is known as the exit point from the stream.

Figure 7:
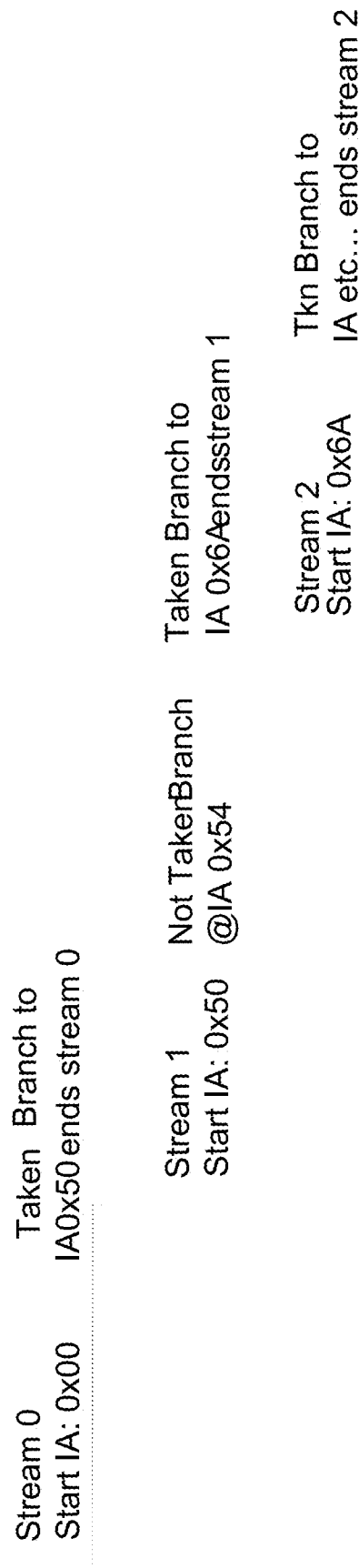
FIG. 7 is a diagram illustrating a stream based column predictor (SPRED) indexed at the start of each stream.
Figure 8:
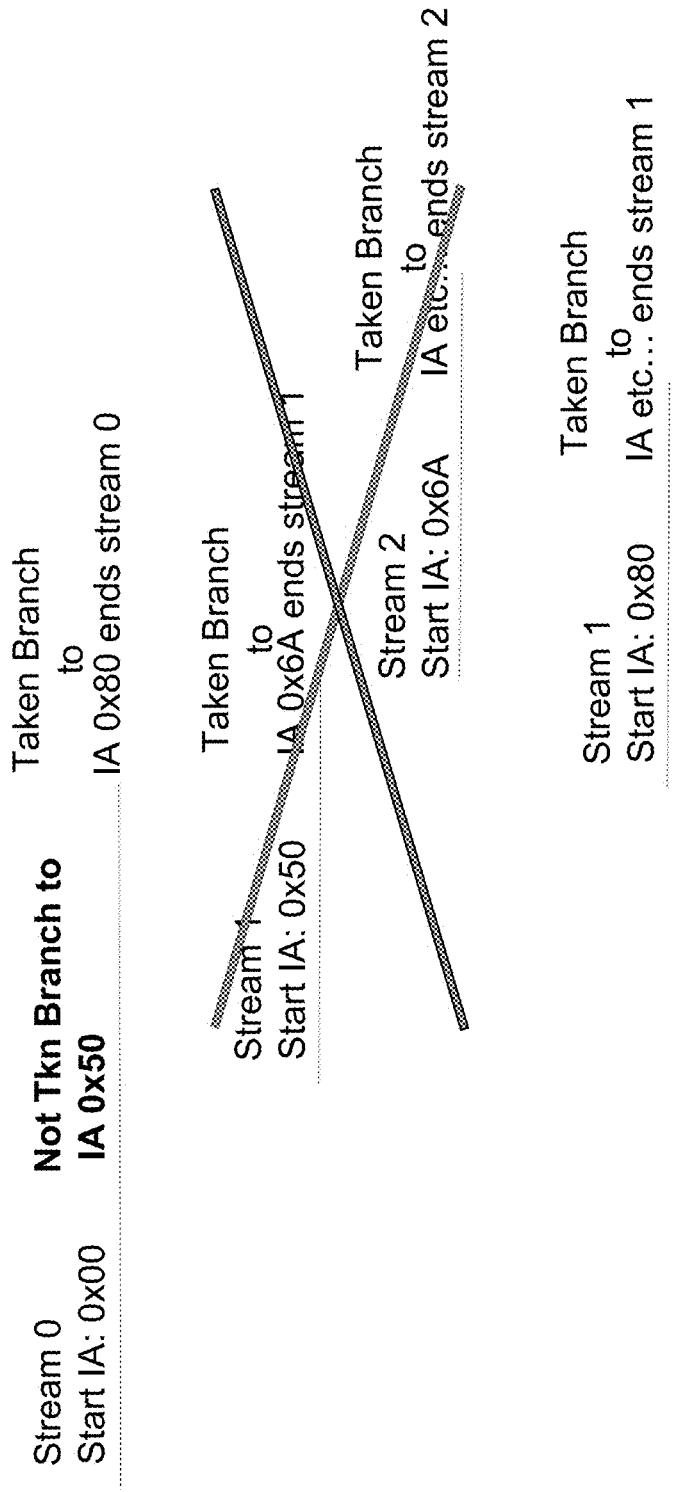
FIG. 8 is a diagram illustrating the stream based column predictor (SPRED) of FIG. 7 having a branch not taken.
Figure 9:
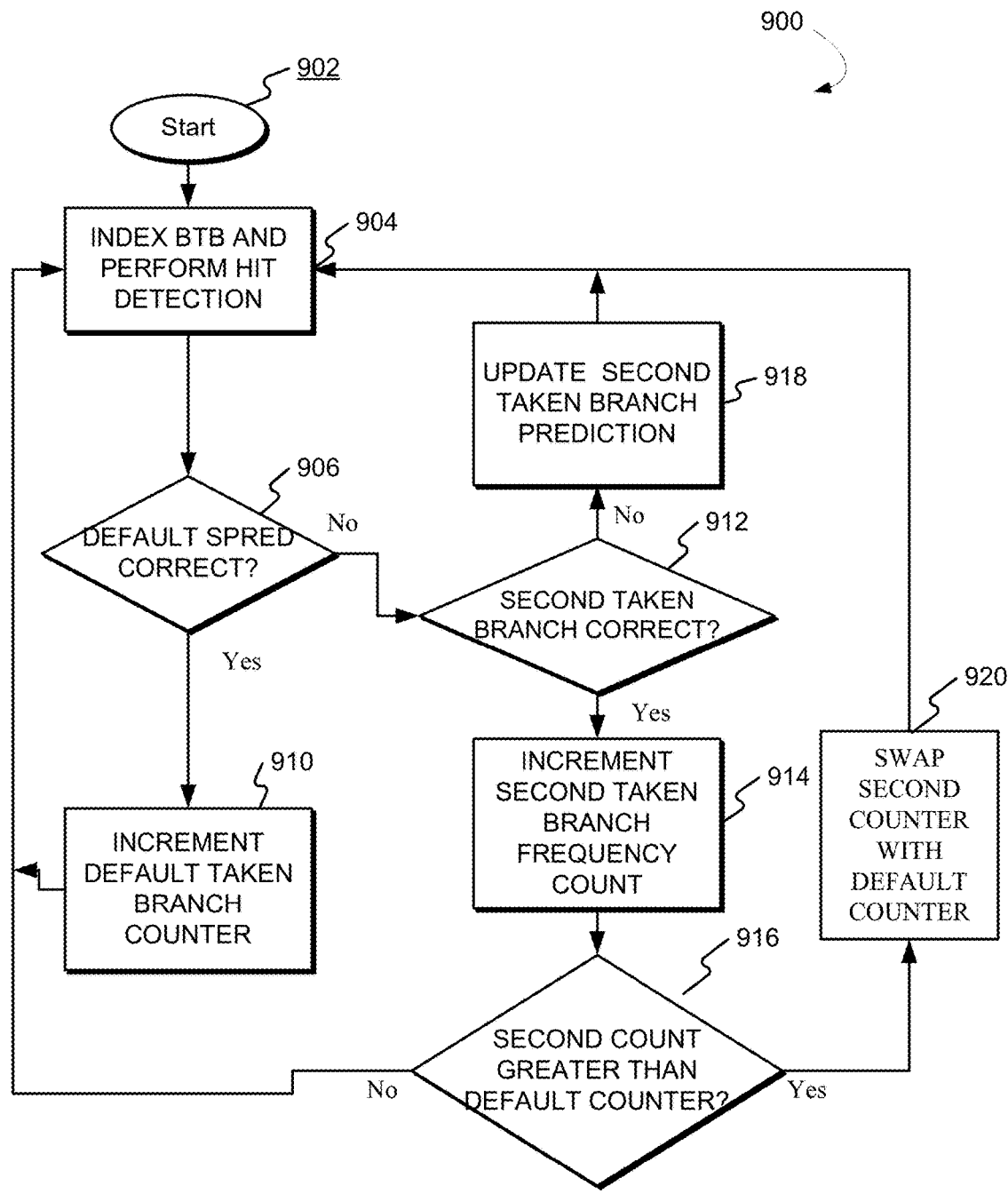
FIG. 9 is a flowchart depicting a computer-implemented method for predicting a branch in an instruction stream in a pipelined high frequency microprocessor.

In general, embodiments of the present invention discussed in FIGS. 1-6 provide a computer system and branch target buffer column predictor (CPRED) used to predict the presence, column, and target of a branch indicated by a given row of a branch target buffer, and an approach to predict the presence and target of a branch using a branch target buffer column predictor. FIGS. 7-9 discuss embodiments of a branch predictor maintaining two or more exit points, where the index accelerator is indexed one time for the stream.

FIG. 1 depicts computer system 100, which is an example of a system that includes embodiments of the present invention. Computer system 100 includes communications fabric 102, which provides communications between computer processor(s) 104, memory 106, persistent storage 108, communications unit 110, input/output (I/O) interface(s) 112, cache 116, a branch target buffer (BTB) 310, and an index accelerator 320. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Memory 106 and persistent storage 108 are computer readable storage media. In this embodiment, memory 106 includes random access memory (RAM). In general, memory 106 can include any suitable volatile or non-volatile computer readable storage media. Cache 116 is a fast memory that enhances the performance of processors 104 by holding recently accessed data and data near accessed data from memory 106.

Program instructions and data used to practice embodiments of the present invention may be stored in persistent storage 108 for execution by one or more of the respective processors 104 via cache 116 and one or more memories of memory 106. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Program instructions and data used to practice embodiments of the present invention may be downloaded to persistent storage 108 through communications unit 110.

I/O interface(s) 112 allows for input and output of data with other devices that may be connected to each computer system. For example, I/O interface 112 may provide a connection to external devices 118 such as a keyboard, keypad, a touch screen, and/or some other suitable input device. External devices 118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 108 via I/O interface(s) 112. I/O interface(s) 112 also connect to a display 120.

Display 120 provides a mechanism to display data to a user and may be, for example, a computer monitor.

Processor(s) 104 include BTB 310, and index accelerator 320, which may be one or more sets of hardware logic components capable of making and storing predictions for the location of branches in an instruction stream.

Figure 2:
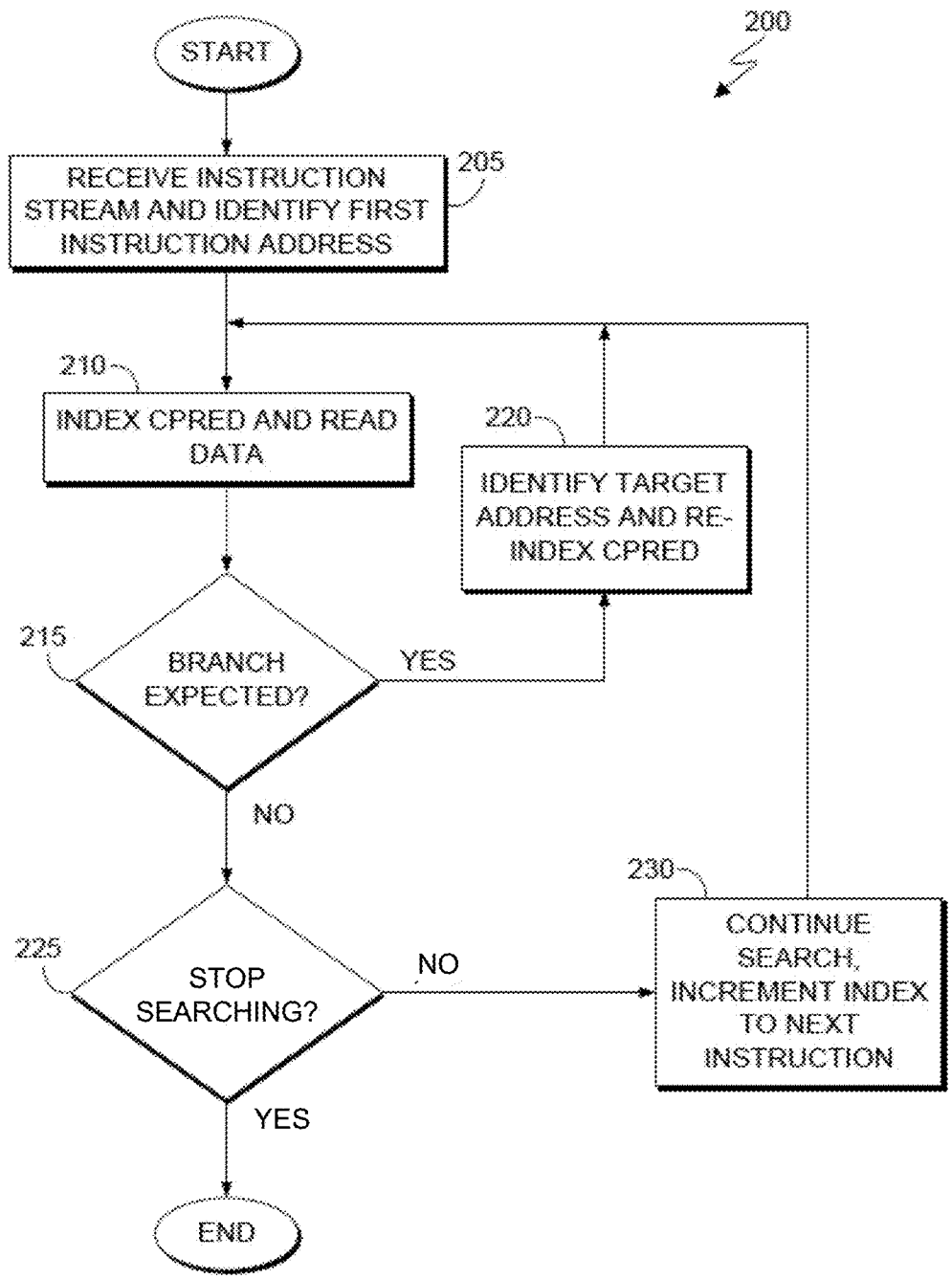
FIG. 2 is a flowchart depicting a method for predicting the presence, column, and target location of a branch, on a computing device within the data processing environment of FIG. 1, in accordance with an embodiment of the present invention.

FIG. 2 is a flowchart, generally depicted 200, depicting the operational steps used in the utilization of the branch target buffer column predictor, in accordance with an embodiment of the invention. It should be appreciated that the process described in FIG. 2 describes the operation of index accelerator 320 in embodiments where the predictions drawn from index accelerator 320 are verified by the predictions later drawn from BTB 310. BTB 310 may be embodied as a metadata prediction engine. In other embodiments where the predictions drawn from index accelerator 320 differ from the predictions drawn from BTB 310, the information stored in index accelerator 320 is updated using the process described in greater detail with respect to FIG. 4. The structure and usage of index accelerator 320 and BTB 310 are described in greater detail with respect to FIGS. 3-9.

In step 205, a microprocessor such as processor(s) 104 receives a stream of instructions describing one or more operations which the microprocessor is to perform, and identifies the address of the first instruction present in the instruction stream. In some embodiments, one or more branches may be present in the instruction stream at various locations. In general, a branch represents a possible break in the sequential instruction stream which describes a new location within the instruction stream where processing is to jump to. In some embodiments, two-way branching is implemented within a high level programming language with a conditional jump instruction such as an if-then-else structure. In these embodiments, a conditional jump can either be "not taken" and continue execution with the set of instructions which follow immediately after the conditional jump in the instruction stream, or it can be a "taken" branch and jump to a different place in instruction stream. In general, a branch such as a two-way branch is predicted using information stored in BTB 310 to be either a "taken" branch or a "not taken" branch before the instruction or set of instructions containing the branch is executed by the microprocessor. It should be appreciated by one skilled in the art that instructions will be structured differently in various embodiments of the invention where different architectures and instruction sets are used by microprocessors such as processor(s) 104.

In step 210, index accelerator 320 is indexed to the row corresponding to the address of the first instruction received in the instruction stream and the information included in the current row of index accelerator 320 is read. In various embodiments, depending on the width of the address space, various numbers of unique instruction addresses may be present, and as a result different numbers of rows may be required for index accelerator 320 in various embodiments of the invention. Generally, only a subset of bits of the instruction address for a given instruction are used to identify the row number in index accelerator 320 which contains branch prediction data for the given instruction. For example, in an embodiment where 32-bit instruction addresses are used (including bits 0 through 31), each instruction address is split into a left tag (L-tag) made up of the first 17 bits of the instruction address (bits 0 through 16), an index made up of the next 10 bits of the instruction address (bits 17 through 26), and a right tag (R-tag) made up of the final 5 bits of the instruction address (bits 27 through 31). In this embodiment, because only the ten bits of the instruction address used as the index are used to determine the row in index accelerator 320 in which the branch prediction data is stored for that instruction, index accelerator 320 includes 1024 (210) rows. Further, in some embodiments index accelerator 320 is designed to contain the same number of rows as BTB 310 and be indexed based on the same 10 bits of the instruction address as BTB 310. In other embodiments, BTB 310 and index accelerator 320 use different numbers of bits to determine which row in the respective tables contain the branch prediction information for that instruction. In these embodiments, it is possible for BTB 310 and index accelerator 320 to have different numbers of rows while still allowing for the invention to operate correctly.

In decision step 215, the data contained in the row of index accelerator 320 corresponding to the current instruction is read to determine if a branch is expected for the current instruction. It should be appreciated that one row of index accelerator 320 can correspond to a large number of instruction addresses in embodiments where aliasing is used, and that in these embodiments multiple instruction addresses will correspond to the same row in index accelerator 320. In one embodiments, the first bit of data stored in the current row of index accelerator 320 contains a binary indication of whether or not a taken prediction is present in the corresponding row of BTB 310. In this embodiment, the determination of whether or not a taken prediction is present in the corresponding row of BTB 310 is made using this single bit of data alone. In this embodiment, if the first bit of data is a zero indicating that there is not taken prediction present in the corresponding row of BTB 310 (decision step 215, no branch), then processor(s) 104 determines if more instructions are present in the instruction stream in decision step 225. If the first bit of data is a one indicating that there is a taken prediction present in the corresponding row of BTB 310 (decision step 215, yes branch), then processor(s) 104 identifies the target address of the first taken branch indicated by the current row of index accelerator 320 in step 220.

In step 220, processor(s) 104 identifies the target address of the first taken branch prediction indicated in the current row of index accelerator 320. In one embodiment, a single 17-bit binary number is contained in each row of index accelerator 320. In this embodiment, the first bit of data present in a row "K" of index accelerator 320 is a binary indicator which indicates whether or not a valid prediction for a taken branch is expected to be present in any of the columns present in row "K" of BTB 310. In this embodiment, because there are six columns present in BTB 310, six bits of additional data are used to indicate whether the first taken prediction is present in each of the six columns present in the row "K" of BTB 310. In general, the "nth" digit of these six digits indicates that the "nth" column of row "K" of BTB 310 will contain the first taken branch prediction. It should be appreciated that only one of the "n" digits can have a value of one at a given time. In this embodiment, the final 10 bits of data are used to store a portion of the predicted target address of the first taken branch predicted to be stored in the row "K" of BTB 310. It should be appreciated that the number of bits of the target address stored in each row of index accelerator 320 varies in different embodiments of the invention. In some embodiments, an additional structure such as a changing target buffer (CTB) may be used to predict the target address for the first taken prediction indicated by one or more rows of index accelerator 320. In these embodiments, the target address of the first taken prediction may be omitted, and the indication of the column of BTB 310 is used to more easily identify the target address of the first taken prediction using the additional structure such as the CTB. In general, the indication of which column of row "K" of BTB 310 contains the first taken prediction is used in embodiments where additional structures such as a CTB are used, or embodiments where the first taken branch is a branch of a certain type such as MCENTRY, MCEND, EX, or EXRL.

Figure 4:
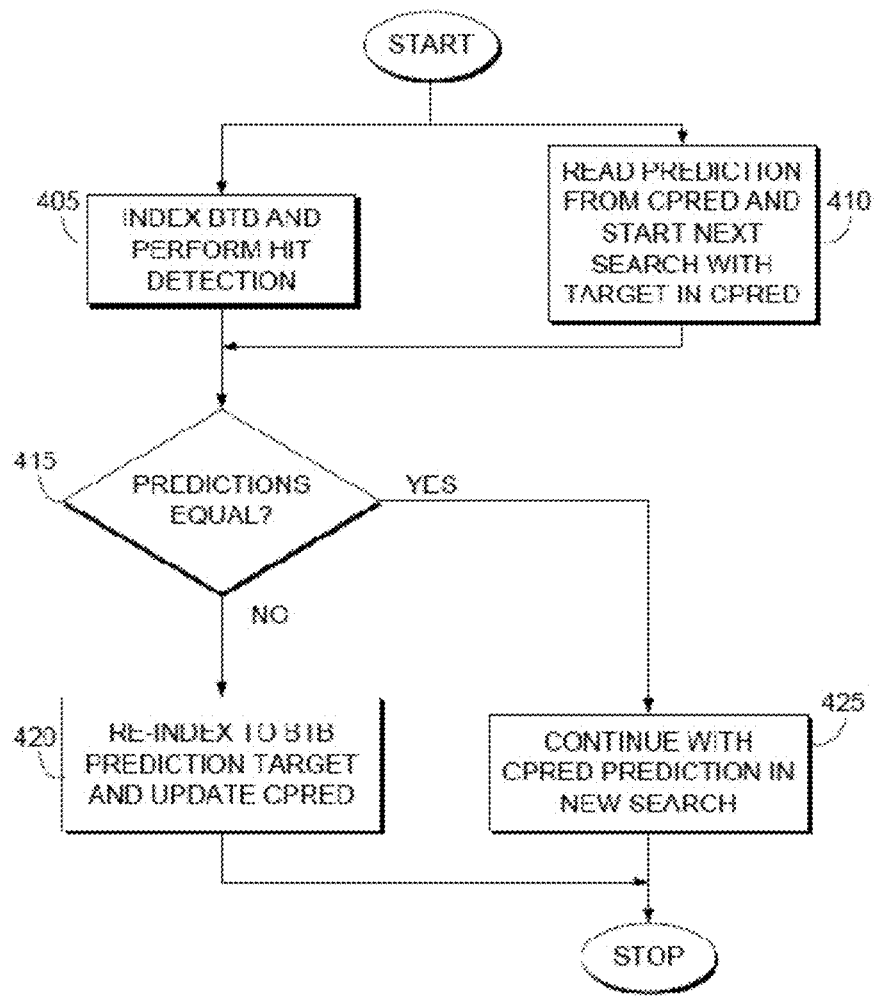
FIG. 4 is a flowchart depicting a method for using the branch target buffer column predictor of FIG. 1, in accordance with an embodiment of the present invention.

It should be appreciated that a prediction is drawn from BTB 310 simultaneously while a prediction is drawn from index accelerator 320, and that the prediction drawn from index accelerator 320 is considered valid until confirmed or disputed by the prediction drawn from BTB 310, as described in greater detail with respect to FIG. 4. In the depicted embodiment, a prediction of a taken branch is drawn by examining the first bit of the 17-bit number included in the current row of index accelerator 320 to determine if a valid prediction is present, and if a valid prediction is present, then examining the last 10 bits of the 17-bit number included in the current row of index accelerator 320 to determine the target address of the predicted branch. It should be appreciated that the last 10 bits of the 17-bit number included in the current row of index accelerator 320 represent a subset of the bits of the target address of the predicted branch. In various embodiments, the bits of data included in index accelerator 320 are the bits of data used to re-index index accelerator 320 to the target address of the prediction. In embodiments where more or fewer bits of data are used to re-index index accelerator 320, the length of the number included in a given row of index accelerator 320 will differ from the 17 bits of data described in the current embodiment. Once the target address of the first taken branch prediction is identified, processor(s) 104 re-indexes index accelerator 320 and BTB 310 to the rows corresponding to the target address for the first taken branch prediction. Once index accelerator 320 and BTB 310 are re-indexed, processor(s) 104 re-starts the process of searching BTB 310 and index accelerator 320 for branch predictions at the new target address in step 210.

In decision step 225, processor(s) 104 determines if there is more address space to search. If the search logic decides that searching should stop (decision step 225, no more searching), then branch prediction search ends. A restart is a means by which processor 104 begins a fresh new search stream in the branch prediction logic. Once a restart it occurs, processor 104 may keep searching sequentially for branches. In other aspects, processor 104 may also accelerate re-indexing whenever index accelerator 320 finds an end of stream, so processor 104 redirects branch predictor 320 to start searching into a new stream. If a request for a restart is received with an instruction address following the previous instruction address (decision step 225, yes allowed to continue searching), then processor 104 continues searching the next sequential rows of BTB 310 and index accelerator 320 for predictions of the presence of branches in step 230. In the depicted embodiment, step 230 includes incrementing the index of the current rows of BTB 310 and index accelerator 320 and starting a new search by reading the data included in the new current rows of BTB 310 and index accelerator 320. In general, the indexes of BTB 310 and index accelerator 320 are incremented because the next row in BTB 310 and index accelerator 320 contains branch prediction information for the next sequential set of instructions present in the instruction stream.

Figure 3:
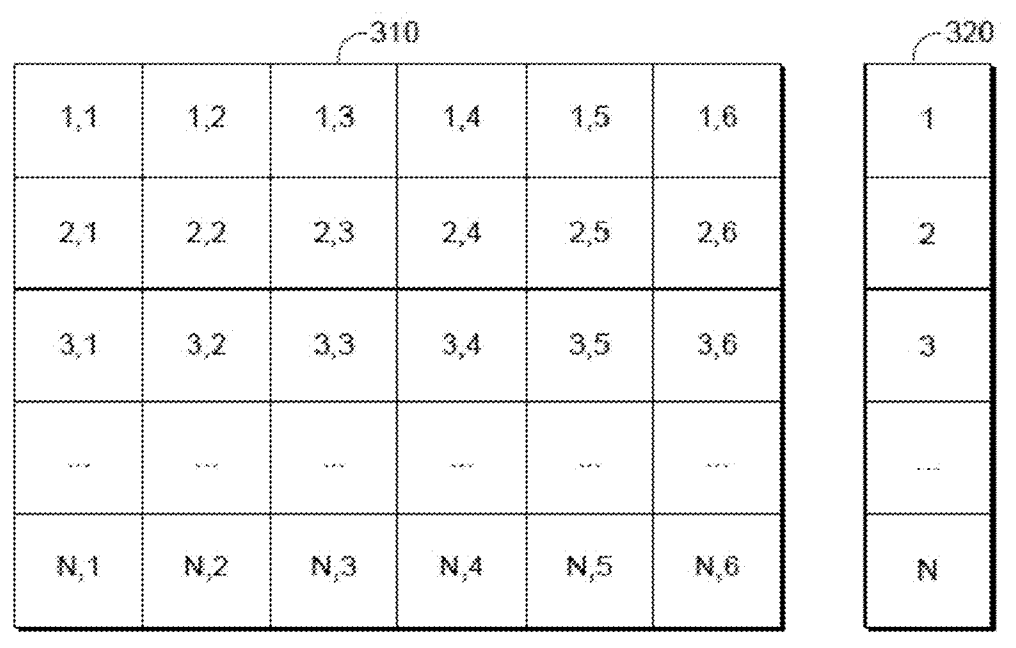

FIG. 3 is a block diagram of the components of branch target buffer (BTB) 310 and branch target buffer column predictor (CPRED) 320, in accordance with an embodiment of the invention.

BTB 310 is a collection of tabulated data including "M" columns and "N" rows of data. In the depicted embodiment, the value of "M" is depicted as being 6, yielding an embodiment where BTB 310 contains a total of six columns used to store the six most recent predictions for each row present in BTB 310. In general, a given cell in BTB 310 is referred to as BTB(N, M), where "N" is the row number and "M" is the column number. It should be appreciated that the number of rows and columns included in BTB 310 varies in different embodiments of the invention and that the depicted embodiment of BTB 310 which included 6 columns and 1024 rows is not meant to be limiting. It should be appreciated by one skilled in the art that various methods for drawing predictions from the information included in BTB 310 may be used in various embodiments of the invention, and that the invention is not limited to any specific method of drawing predictions from the information included in BTB 310. Additionally, the information included in BTB 310 may be stored or encoded differently in various embodiments of the invention, and the examples provided of how information is stored in BTB 310 is not meant to be limiting.

Index accelerator 320 is a one-dimensional array of data used in conjunction with BTB 310 by branch prediction logic to predict the column in which the first taken prediction will be present in BTB 310 for a given row. In some embodiments, index accelerator 320 contains the same number of rows ("N") as BTB 310, with a given row "K" in index accelerator 320 providing information related to the first taken prediction present in the corresponding row "K" of BTB 310. In other embodiments, index accelerator 320 contains fewer rows than BTB 310, and in these embodiments aliasing is used to apply the column prediction contained in row "K" of index accelerator 320 to multiple rows in BTB 310. In general, decreasing the size of index accelerator 320 is desirable in embodiments where reducing the amount of time required to access index accelerator 320 or limiting memory required by index accelerator 320 is important. Additionally, increasing the size of index accelerator 320 is desirable in embodiments where reducing the amount of time required to access index accelerator 320 or limiting memory required by index accelerator 320 is not important, and improving the accuracy of each branch prediction is important. For example, in an embodiment where the address space has a dimension of three bits, BTB 310 contains eight rows of data to ensure that each possible address corresponds to a unique row in BTB 310 which can be used to predict the presence of branches in the instruction stream for that address. In this example, it is possible to use only two rows of data for index accelerator 320 and utilize the prediction contained in each row of index accelerator 320 for four rows of BTB 310. For example, if BTB 310 includes rows numbered 1 through 8, then row 1 of index accelerator 320 is used to provide a column prediction for rows 1 through 4 of BTB 310 while row 2 of index accelerator 320 is used to provide a column prediction for rows 5 through 8 of BTB 310.

In general, the data included in each row of index accelerator 320 describes which column in BTB 310 contains the last first desired taken prediction for the corresponding row in BTB 310. In some embodiments, the address of the first taken branch target for a row "K" in BTB 310 is included in the entry for the corresponding row "K" in index accelerator 320. The reason for including the address of the first taken branch target is to be able to re-index BTB 310 and index accelerator 320 to the address of the first taken branch target without having to retrieve the address of the first taken branch target from BTB 310.

In various embodiments, BTB 310 and index accelerator 320 are accessed simultaneously, and a prediction is drawn from both BTB 310 and index accelerator 320 independently. It should be appreciated by one skilled in the art that in these embodiments, many different methods for drawing predictions from BTB 310 may be used. Because of the decreased number of cycles required to draw a prediction from index accelerator 320, the prediction drawn from index accelerator 320 is used as a preliminary prediction until confirmed by the prediction drawn from BTB 310. In embodiments where the prediction drawn from BTB 310 is the same as the prediction drawn from index accelerator 320, branch prediction logic proceeds to continue retrieving additional predictions for the following instructions in the instruction stream. In embodiments where the prediction drawn from index accelerator 320 differs from the prediction later drawn from BTB 310, the prediction drawn from BTB 310 is assumed to be more reliable and as a result BTB 310 and index accelerator 320 are both re-indexed to the address of the first taken branch target predicted by BTB 310 and the column prediction data and address of the new first taken branch target are updated for the corresponding row "K" in index accelerator 320.

FIG. 4 is a flowchart depicting the operational steps required to utilize BTB 310 and index accelerator 320 in conjunction with each other to draw branch predictions and update the predictions stored in index accelerator 320 in the event that an incorrect prediction is present.

In step 405, BTB 310 is indexed to a row "K" corresponding to the current instruction, and hit detection is performed on the row "K" to determine which column (if any) contains a usable branch prediction for that instruction. In general, it takes five clock cycles for a branch prediction to be reported using the information stored in BTB 310, and after the first prediction is reported, additional prediction are reported once every four cycles. As a result of this, predictions drawn using the information stored in BTB 310 alone can be issued every four clock cycles. In this embodiment, due to predictions from index accelerator 320 being drawn faster (once every two clock cycles once the first prediction is reported), BTB 310 and index accelerator 320 are both re-indexed once predictions are drawn from index accelerator 320 every second clock cycle, and the predictions drawn from BTB 310 alone are used to verify the predictions drawn from index accelerator 320 two clock cycles earlier. The cycles required for drawing predictions from the information included in BTB 310 and index accelerator 320 are described in greater detail with respect to FIGS. 5 and 6.

In step 410, index accelerator 320 is indexed to a row "K" corresponding to the current instruction and the prediction contained in the row "K" of index accelerator 320 is read. The prediction read from row "K" of index accelerator 320 is used to start a new search using the partial target address read from row "K" of index accelerator 320. In the depicted embodiment, steps 405 and 410 begin simultaneously and occur in parallel when a new instruction is received by processor(s) 104. In general, it takes three clock cycles for a prediction to be reported from the data included in index accelerator 320. In clock cycle 0, index accelerator 320 is indexed to the row "K" corresponding to the current instruction. In clock cycle 1, the information stored in the row "K" of index accelerator 320 is read by processor(s) 104, along with information describing which columns in BTB 310 is expected to contain the first taken branch. In clock cycle 2, the prediction of the first taken branch is reported and both BTB 310 and index accelerator 320 are re-indexed to the address of the first taken branch predicted by the information in row "K" of index accelerator 320. Both BTB 310 and index accelerator 320 are re-indexed at this time to ensure that the branch prediction search for the next target location occurs as soon as possible. It should be appreciated that clock cycle 2 serves as clock cycle 0 for the following branch prediction search performed using the information stored in index accelerator 320.

In decision step 415, the prediction reported in step 410 is compared to the prediction reported in step 405 to determine if index accelerator 320 predicted the location and target of the first taken branch present in BTB 310 correctly for the given branch. In one embodiment, the target addresses included in both branch predictions are compared to determine if there is any difference between the prediction reported in step 410 and the prediction reported in step 405. In various embodiments, the prediction drawn from the data included in index accelerator 320 includes only a subset of the bits of the target address of the prediction drawn from the information included in BTB 310. In these embodiments, only the bits which are included in both predictions are compared. If the predictions are equal (decision step 415, yes branch), then processor(s) 104 continues with the branch prediction search initiated in step 410 using the data received from index accelerator 320 in step 425. If the predictions received are not equal (decision step 415, no branch), then processor(s) 104 re-indexes index accelerator 320 and BTB 310 to the first taken branch prediction reported in step 405, and starts the branch prediction search over from that point.

In step 420, BTB 310 and index accelerator 320 are re-indexed to the address of the first taken branch predicted in step 405. Additionally, the information stored in the row "K" of index accelerator 320 is updated to reflect the prediction reported in step 405. In this process, the correct address of the branch target predicted in step 405 is written to row "K" of index accelerator 320 along with the column of BTB 310 from which the prediction reported in step 405 was fetched.

In step 425, the search initiated in step 410 continues based on the prediction drawn from the information included in row "K" of index accelerator 320. It should be appreciated that the process of continuing the search started in step 410 includes re-indexing index accelerator 320 to the row corresponding to the target address of each new branch prediction as they are encountered. For example, in the depicted embodiment, a branch prediction included in row "K" of index accelerator 320 includes a target address corresponding to row "L" of index accelerator 320. After re-indexing index accelerator 320 to row "L", a prediction with a target address corresponding to row "M" is read. In general, the process of identifying successive predictions is referred to as continuing a search.

Figure 5:
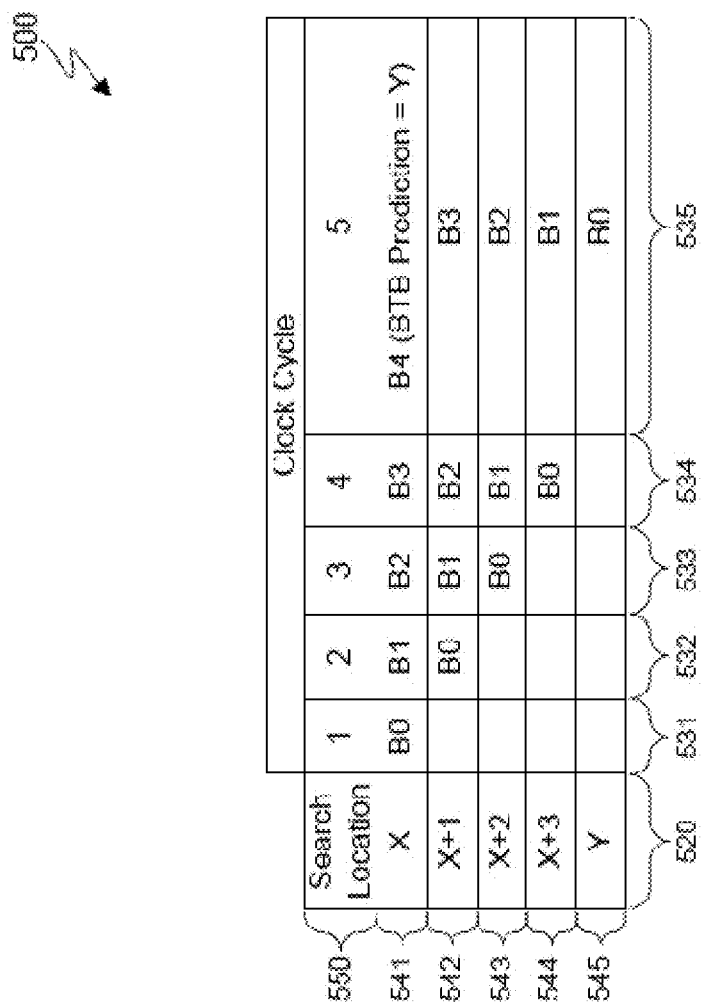
FIG. 5 is a timing diagram illustrating the progression of successive branch prediction searches performed using the information stored in the BTB, in accordance with an embodiment of the invention.

FIG. 5 is a timing diagram, generally designated 500, illustrating successive branch prediction searches performed using BTB 310. Each column of timing diagram 500 present below row 550, such as columns 531, 532, 533, 534, and 535 illustrates the current status of each branch prediction search currently being performed by processor 104 in a given clock cycle, with the clock cycle number indicated by the cell present within row 550 of that column. Each row of timing diagram 500 present below row 550, such as rows 541, 542, 543, 544, and 545 illustrates the current state of a branch prediction search performed by processor 104 using BTB 310 in successive clock cycles. For the search represented by a given row of timing diagram 500, the row of BTB 310 currently being searched is indicated by the cell within column 520 of that row. Row 550 indicates the current clock cycle of processor 104 performing the various branch prediction searches indicated by timing diagram 500.

Row 541 illustrates a branch prediction search with search address "X" which involves drawing a prediction using the information included in row "X" of BTB 310. In the depicted embodiment, the prediction is drawn from the information included in row "X" of BTB 310 in the fifth cycle of the branch prediction search (B4) (row 541, col 531). In the depicted embodiment, the five cycles required for each branch prediction search performed using BTB 310 are B0, B1, B2, B3, and B4. In cycle B0, BTB 310 is indexed to a starting search address of "X". In some embodiments the starting search address has additional properties associated with it such as an indication of whether or not the instructions received by processor 104 are in millicode, the address mode, a thread associated with the instructions received by processor 104, or other information stored in BTB 310 in various embodiment of the invention. In general, cycle B1 is an access cycle for BTB 310 which serves as busy time while information included in row "X" of BTB 310 is retrieved. In cycle B2, the entries in row "X" are returned from BTB 310 and hit detection begins. In various embodiments, hit detection includes ordering the entries in row "X" by instruction address space, filtering for duplicate entries, filtering for a millicode branch if the search is not for a millicode instruction or set of millicode instructions, or filtering for other criteria indicated by the entries present in row "X" of BTB 310. In some embodiments, hit detection additionally includes discarding any branch with an address earlier than the starting search address and identifying the first entry that is predicted to be taken. Additionally, any entry for a taken branch present after the first taken branch in the instruction space may be discarded, and all of the remaining branch predictions including the first taken branch prediction and a number of not taken branch predictions are reported. In cycle B3, hit detection continues and concludes with an indication of whether or not any of the entries included in row "X" of BTB 310 contain a valid prediction of a branch which is expected to be encountered in the instruction stream. In cycle B4, the target address of the first taken prediction is reported and a new branch prediction search is initiated with a search address equivalent to the target address of the first taken prediction reported.

In the depicted embodiment, in clock cycle 1 a branch prediction search with a search address of "X" begins cycle B0 (row 541, col 531). In clock cycle 2, the branch prediction search with a search address of "X" advances to cycle B1 (row 541, col 532), while a new branch prediction search with a search address of "X+1" begins cycle B0 (row 542, col 532). It should be appreciated that the index "X+1" represents the next sequential portion of the address space present after "X", and that correspondingly row "X+1" represents the next row present in BTB 310 present after row "X". In clock cycle 3, the branch prediction search with a search address of "X" advances to cycle B2 (row 541, col 533), the branch prediction search with a search address of "X+1" advances to cycle B1 (row 542, col 533), and a new branch prediction search is initiated with a search address of "X+2" (row 543, col 533). In clock cycle 4, the branch prediction search with a search address of "X" advances to cycle B3 (row 541, col 534), the branch prediction search with a search address of "X+1" advances to cycle B2 (row 542, col 534), the branch prediction search with a search address of "X+2" advances to cycle B1 (row 543, col 534), and a new branch prediction search is initiated with a search address of "X+3" (row 544, col 534). In clock cycle 5, the branch prediction search with a search address of "X" advances to cycle B4 and issues a prediction of a first taken branch with a target address of "Y" (row 541, col 535). As illustrated in the depicted embodiment of the invention, a new branch prediction search is initiated in clock cycle 5 with a search address of "Y" (row 545, col 535). In some embodiments, the searches with search indices "X+1", "X+2", and "X+3" are cancelled upon the search with an index of "X" reporting a prediction for a taken branch. However, in the depicted embodiment, these searches continue to advance to the next cycles before being cancelled following clock cycle 5.

In general, it should be appreciated that, using BTB 310 alone, branch prediction logic can identify a taken prediction up to once every four clock cycles.

Figure 6:
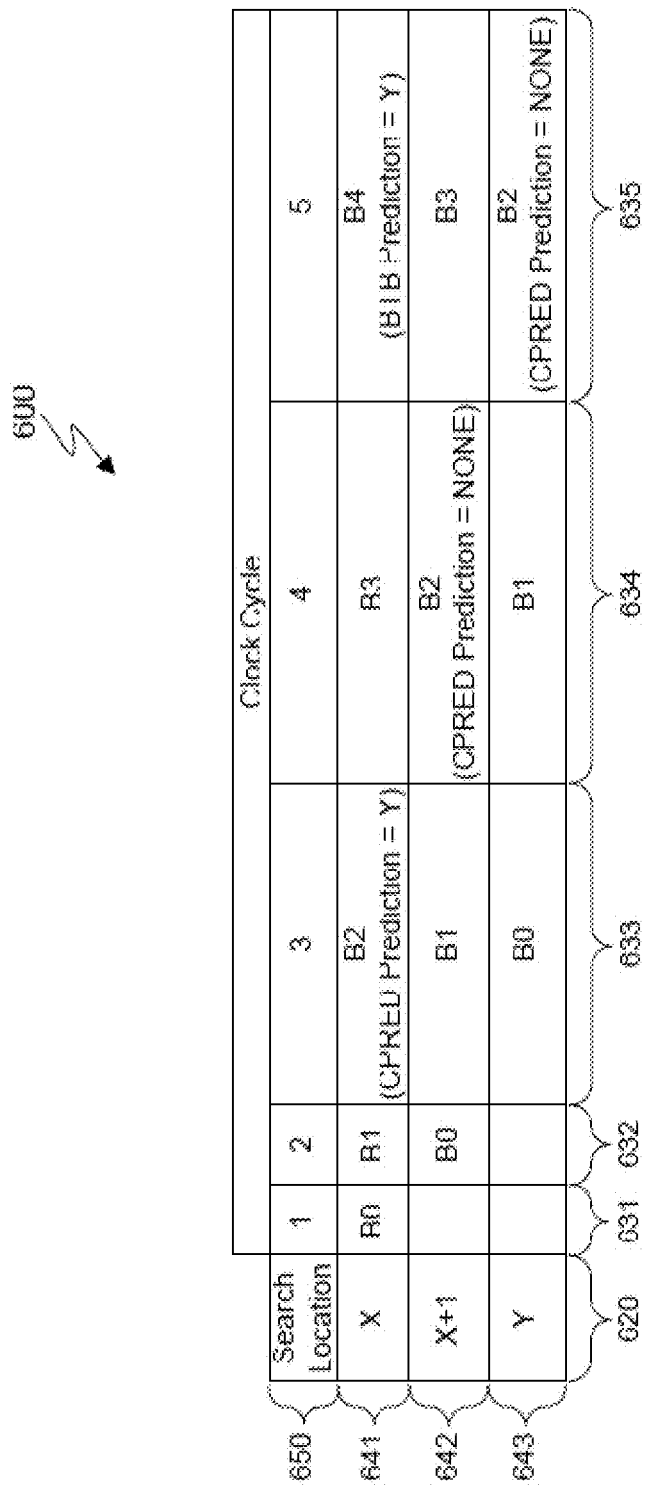
FIG. 6 is a timing diagram illustrating the progression of successive branch prediction searches performed using the information stored in the BTB, in accordance with an embodiment of the invention.

FIG. 6 is a timing diagram, generally designated 600, illustrating successive branch prediction searches performed using BTB 310 and index accelerator 320. Similarly to FIG. 5, each column of timing diagram 600 present below row

650, such as columns 631, 632, 633, 634, and 635 illustrates the current status of each branch prediction search currently being performed by processor 104 in a given clock cycle, with the clock cycle number being indicated by the cell present within row 650 of that column. Each row of timing diagram 600 present below row 650, such as rows 641, 642, and 643 illustrates the current state of an individual branch prediction search performed by processor 104 using BTB 310 and index accelerator 320 in each clock cycle. For the search represented by a given row of timing diagram 600, the row of BTB 310 and index accelerator 320 currently being searched is indicated by the cell within column 620 of that row. Row 650 indicates the current clock cycle of processor 104 performing the various branch prediction searches indicated by timing diagram 600.

Row 641 illustrates a branch prediction search with search address "X" which involves drawing a prediction using the information included in row "X" of BTB 310 and row "X" of index accelerator 320. It should be appreciated that in some embodiments, different indexing structures are used for BTB 310 and index accelerator 320. In these embodiments, the row "X" of BTB 310 from which information is read will differ from the row of index accelerator 320 from which information is read. It should additionally be appreciated that the embodiment where BTB 310 and index accelerator 320 use the same indexing structure serves as an example of one embodiment and is not meant to be limiting. In the depicted embodiment, a prediction is drawn from the information included in row "X" of index accelerator 320 in the third cycle of the branch prediction search (cycle B2), and a prediction is drawn from the information included in row "X" of BTB 310 in the fifth cycle of the branch prediction search (cycle B4). In the depicted embodiment, the five cycles required for each branch prediction search performed using information included in BTB 310 are the same five cycles B0 through B4 as described in greater detail with respect to FIG. 5. In this embodiment, the three cycles required to draw a prediction from the information included in row "X" of index accelerator 320 are B0, B1, and B2. In cycle B0, index accelerator 320 is indexed to a starting search address of "X". In some embodiments the starting search address has additional properties associated with it such as an indication of whether or not the instructions received by processor 104 are in millicode, the address mode, a thread associated with the instructions received by processor 104, or other information stored in BTB 310 or index accelerator 320 in various embodiments of the invention. In general, cycle B1 is an access cycle for index accelerator 320 which serves as busy time while information included in row "X" of index accelerator 320 is retrieved. In cycle B2, the target address of the first taken prediction is reported and a new branch prediction search is initiated with a search address equivalent to the target address of the first taken prediction reported.

In the depicted embodiment, in clock cycle 1 a branch prediction search with a search address of "X" begins cycle B0 (row 641, col 631). In clock cycle 2, the branch prediction search with a search address of "X" advances to cycle B1 (row 641, col 632), while a new branch prediction search with a search address of "X+1" begins cycle B0 (row 642, col 632). It should be appreciated that the index "X+1" represents the next sequential portion of the address space present after "X", and that correspondingly row "X+1" represents the next DWQ (or next incremental branch prediction search). In clock cycle 3, the branch prediction search with a search address of "X" advances to cycle B2 and returns a prediction of a first taken branch with a target address of "Y" (row 641, col 633). As illustrated in the depicted embodiment of the invention, a new branch prediction search is initiated in clock cycle 3 with a search address of "Y" (row 643, col 633). In some embodiments, the search with search address "X+1" is cancelled upon the search with an index of "X" reporting a prediction for a taken branch. However, in the depicted embodiment, these searches continue without being cancelled. In clock cycle 4, the branch prediction search with a search address of "X" advances to cycle B3 (row 641, col 634), the branch prediction search with a search address of "X+1" advances to cycle B2 and returns a prediction of no taken branch (row 642, col 634), and the branch prediction search with a search address of "Y" advances to cycle B1 (row 643, col 634). In some embodiments, a new branch prediction search with a search address of "Y+1" may begin in clock cycle 4, however no additional searches are depicted in FIG. 6. In clock cycle 5, the branch prediction search with a search address of "X" advances to cycle B4 and reports a prediction of a first taken branch with a target address of "Y" (row 641, col 635) based on the information contained in BTB 310, confirming the prediction reported in clock cycle 3 using the information contained in index accelerator 320. Additionally in clock cycle 5, the branch prediction search with a search address of "X+1" advances to cycle B3 (row 642, col 635) and the branch prediction search with a search address of "Y" advances to cycle B2 and reports a prediction of no taken branch (row 643, col 635). In embodiments where a branch is predicted in clock cycle 5, a new branch prediction search with a search address equal to the target address of the branch prediction in clock cycle 5 may begin in clock cycle 5, however no additional searches are depicted in FIG. 6.

In general, it should be appreciated that, using both BTB 310 and index accelerator 320, branch prediction logic can identify a taken branch up to once every two clock cycles. Additionally, it should be appreciated that the use of index accelerator 320 allows for predictions to be reported earlier and allows for the creation of a new search with a search address equivalent to the target address of a taken branch prediction in cycle B2 as opposed to cycle B4.

According to some embodiments discussed thus far, the SPRED's output will tell the branch prediction logic where it thinks the exit point, or taken branch that ends the stream is located. For instance, at the start of stream 0, the start IA of 0x00 would be used to index into the stream based index accelerator 320, and SPRED's output would indicate the exit point is X DWQs from the start of stream 0. The SPRED output would be used to accelerate indexing into stream 1 once X DQWs were searched in stream 0, where it would then be indexed with start IA x50, and would produce an output of Y DQWs, indicating where the exit point of stream 1 resides, etc. With this scheme, the SPRED would only need to be read once per stream, with the starting search address of the stream (for example) and in the SPRED entry would be the information containing the DQW offset that the exit point is at.

As described previously, the BTB is generally indexed using an instruction address, and is incremented by a certain amount to continue searching sequentially for branching within a region of code. Each time the processor instruction stream is restarted, such as for a branch wrong, searching starts and what is known as a new stream. Therefore, each predicted taken branch starts a new stream.

In some instances, a stream starting from a certain search address could have different behaviors and consequentially different taken branches that end the stream. FIG. 7 is a diagram illustrating a stream based column predictor (SPRED) indexed at the start of each stream. As depicted in FIG. 8, the same stream 0 now predicts the branch at instruction address (IA) 0x00+X DQW to be not taken, and instead a different branch further downstream within stream 0 is predicted taken to a different address IA 0x80. As shown in FIG. 7, processor 104 gets a restart and starts execution at instruction address (IA) 0x00. This is the beginning of stream 0. At an instruction address (IA) of 0x00+X DQWs, a taken branch ends stream 0 and starts stream 1 at the target address of the branch ending stream 0, IA x50. Stream 1 ends at an IA of 0x50+Y DQWs where a taken branch's target IA is 0x6A, where subsequent stream 2 starts, and so on.

In the example of FIG. 7, a stream based column predictor (SPRED) would be indexed at the start of each stream. Its output will tell the branch prediction logic where it thinks the exit point, or taken branch that ends the stream, is located. For instance, at the start of stream 0, the start IA of 0x00 would be used to index into the stream based SPRED, and the SPRED's output would indicate the exit point is X DWQs from the start of stream 0. The SPRED output would be used to accelerate indexing into stream 1 once X DQWs were searched in stream 0, where it would then be indexed with start IA x50, and would produce an output of Y DWQs, indicating where the exit point of stream 1 resides, etc. One potential outcome, however, is that a stream could have more than one taken branch which would end the stream. FIG. 8 is a diagram illustrating the stream based column predictor (SPRED) of FIG. 7 having a branch not taken.

Referring now to FIG. 8, according to some embodiments, the same stream 0 may now predict the branch at instruction address (IA) 0x00+X DQW to be not taken, and instead the processor may predict a different branch further downstream within stream 0 as a taken branch to a different IA, 0x80. In some aspects, a stream based SPRED would do the following: at the start of stream 0, it would be indexed with IA 0x00 and predict the end of the stream is X DQWs from the start of stream 0. Once X DQWs are searched, the SPRED would incorrectly redirect the BPL to IA x50. Logic that validates the SPRED prediction would realize that the exit point really was not X DQWs from the start of stream 0, but rather X' DQWs. Each time the column predictor is incorrect, the processor updates with a location of the exit point for the end of the stream.

In the example depicted in FIG. 8, the SPRED entry at index location 0x00 would change from X to X'. In this example, if the program eventually starts back at the stream at IA 0x00 again, the SPRED would predict the exit point is X' DQWs from the start of the stream. If the behavior of the code reverted to the first case, where the exit point is X DQWs from the start of the stream, the SPRED could incorrectly predict the exit point for stream 0 is X' DQWs, when it was really X DQWs. There could be one branch that ends the stream most of the time, and every so often a different branch ends the same stream, as in the above example.

FIG. 9 is a flowchart depicting a computer-implemented method 900 for predicting a branch in an instruction stream having more than one exit in a pipelined high frequency microprocessor, according to one embodiment. According to some embodiments, each column predictor entry would contain the following information to help identify the most common taken branch from a stream, including: a location of the end of the stream, a first exit point "A" (such as the number of double quadwords (DQW) in from the start of the stream the taken branch is expected to be found and column location), a location of another end of a stream (exit point "B"), a counter for exit point A, and a counter for the second exit point B.

According to some embodiments, each SPRED entry may contain two DQW values for the locations of exit points A and B. The processor may use the first exit point (A) as the primary or default prediction for the taken branch (referred to also as an exit point or a branch exit point) for the stream. Each of the first and second exit points A and B may also include a counter that is incremented every time that particular exit point is or would have been correct. Although this example depicts two taken branches, according to other embodiments, each stream may contain information on more than two stream exit points. Processor 104 may observe any number of taken branches.

Referring now to FIG. 9, after an initial start step 902, after a new column predictor entry, processor 104 may index the BTB and perform hit detection. Accordingly, processor 104 may receive a first instruction within a first instruction stream, where the first instruction includes DQW values for the locations of exit points A (a first instruction address) and B (a second instruction address). According to some embodiments, the first exit point A may be a predetermined default exit point. Processor 104 may select a current row of the BTB and a corresponding current row of a one-dimensional array, based at least in part, on a first count value indicative of a taken branch frequency. The taken branch frequency count value may be indicative of a prediction accuracy. In some aspects, the higher the frequency counter, the better (more accurate) the prediction it represents, because each count indicates one instance of a correct prediction observed by processor 104.

Accordingly, processor 104 may place the exit DQW of the stream into a first exit point (position A, which has the first instruction address) and the first counter value for the first exit point prediction, which is initially set as the default exit point, is set to 0. Processor 104 may receive a first instruction within a first instruction stream that includes a first instruction address. Processor 104 may perform a hit detection by searching an index accelerator predictor one time for the stream.

As shown in block 906, processor 104 may determine whether the default taken branch (which is a first exit address ending the instruction stream) is correct. Each taken branch observed by processor 104 may include its own frequency count indicative of when that particular branch matches the default predicted branch (e.g., branch exit point A). Whenever the default SPRED exit accelerator predictor is correct, as shown in block 910, processor 104 may increment the frequency count of the default taken branch counter that taken makes a correct column predictor prediction, its counter is incremented (e.g., saved counter value=saved value+1). Processor returns to index the BTB 310 and perform another hit detection, as shown in block 904.

As shown in block 918, processor 104 may update the second exit point (taken branch) of the branch prediction stream, and determine at block 912 whether the prediction for the second taken branch is correct.

As shown in block 906, when processor 104 encounters another taken branch for the same stream (the column predictor using exit point A) was wrong, processor 104 may determine whether the second taken branch was correct, as shown in block 912. Accordingly, updating may include replacing a prediction for a least frequently observed taken branch with the prediction for a more recently used taken branch ending the branch stream.

As shown in block 914, processor 104 may update the second taken branch prediction when the second taken branch (the observed taken branch) is correct. Updating may include increasing a frequency count indicative of when the observed taken branch matches one of the plurality of taken branches. Accordingly, processor 104 may place the new DQW exit point into exit position B (the second taken branch), and set the second taken branch count value indicative of the second prediction accuracy to 0. Processor 104 may replace the second count value with zero if the second taken branch prediction is not correct, as shown in block 918. Accordingly, if the column predictor continues to make bad predictions using exit point A, but the DQW exit point in B would have been correct, processor 104 may be configured to increment exit point B's counter. As shown in block 916, processor 104 may determine whether the second count is greater than the default count. Processor 104 may set either the first exit point of the branch prediction stream or the second exit point of the branch prediction stream as a default target address based the prediction accuracy as determined by the counter values.

According to some embodiments, as shown in block 920, whenever exit point B's counter exceeds exit point A's counter, processor 104 may swap them such that B is now in A's position and future column predictor predictions would be made with the exit position with the higher count value. The swap indicates that exit point A's count value should always be greater than exit point B's. When exit point A's count value saturates at all ones, processor 104 may divide the first and second exit point's counters by two. Any new DQW exit points may replace the value in exit point position B, again zeroing out exit point B's counter.

The process begins again at block 904 by indexing the BTB and performing a hit detection.

Employing this approach, index accelerator 320 may continue to maintain knowledge of the most frequent exit point from the stream. If index accelerator 320 encounters another exit point that was more frequent than the one currently being used for SPRED predictions, then it can switch to using the more frequently used exit point. index accelerator 320 is thus able to track multiple exits from the stream, keeping track of the most common exit point and predict using the most common exit point.

Some embodiments provide an efficient way to improve branch prediction throughput. Some aspects may accelerate re-indexing of an asynchronous lookahead branch predictor for taken predictions. Embodiments may also provide power prediction information to power down branch prediction components that are not needed for a particular stream of instructions.

In some aspects, each SPRED entry may indicate where a stream ends, where the next stream begins, and the component branch predictors that are needed in the next stream. Upon accelerating the index into the next stream, the power prediction information may be used to only power up the structures expected to be needed. According to some embodiments, it may be advantageous to accelerate re-indexing of an asynchronous lookahead branch predictor for taken predictions, and provide power prediction information to power down branch prediction components that are not needed for a particular stream of instructions. Accordingly, such an arrangement may be more energy efficient and provide a larger computational capacity. Like index accelerator 320, index accelerator 320 can be written at prediction time. Processor 104 may install an entry upon making a qualifying taken prediction that was not accelerated because it was not found in index accelerator 320.

Qualifying can depend on the type of branch instruction (information from the BTB 310) and the source predictors of the target address. For instance branches with CTB-provided target addresses may not qualify for being accelerated by index accelerator 320. Additionally if index accelerator 320 is used and the branch prediction search process did not find a qualifying taken branch in the search offset and column expected, then that SPRED entry is written to invalidate it. If index accelerator 320 is used and a different qualifying taken branch is found, then the install rule causes the incorrect SPRED entry to be overwritten with the newly installed one.

To write power prediction information into index accelerator 320, upon using or installing a SPRED entry corresponding to start of stream X, processor 104 may remember its power prediction information. Upon installing a new entry power prediction is written based on implementation dependent install policy: processor 104 could write to initially power up all structures, power down all structures, or selectively power up some of the structures. For all searches in stream X+1, logic monitors which prediction structures are needed for branches found within the stream. This includes all predicted not-taken branches and the predicted taken branch ending the stream. Upon predicting the taken branch ending stream X+1, if the monitored needed structure information differs from the power prediction from SPRED entry for stream X, processor 104 may write the updated information into the entry indexed with the starting search address of stream X.

Power prediction information can include, but is not limited to the columns in BTB 310 that are needed, the columns in the branch history table (BHT) that are needed, and whether pattern history table (PHT), changing target buffer (CTB), or perceptron predictors are needed.

According to some embodiments, processor 104 may access index accelerator 320 "inline" along with the search process as described above. Processor 104 may also access index accelerator 320 in a lookahead manner. In that case the SPRED would re-index itself immediately upon finding a hit. The results would be queued and applied to accelerate the re-index of the BPL search process when the oldest queued SPRED result matches the current search stream and search number offset within that stream.

Some disclosed embodiments described herein extend the idea of the branch target buffer column predictor (CPRED) and make it more efficient by storing stream based index accelerator prediction (SPRED) entries for each stream of instructions, where a stream is a sequence of instructions ending with a taken branch rather than with every search address. There are often multiple sequential search addresses within a stream. Furthermore this stream-based organization allows for a large capacity power predictor. Each SPRED entry indicates where a stream ends, where the next stream begins, and the component branch predictors that are needed in the next stream. According to some embodiments, upon accelerating the index into the next stream, processor 104 uses power prediction information to only power up the structures expected to be needed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for predicting an instruction that ends an instruction stream in a pipelined high frequency microprocessor, the method comprising:

receiving, by a processor, a first instruction within a first instruction stream that comprises one or more branch instructions, and the first instruction comprising a first instruction address;

searching, by the processor, an index accelerator predictor based on the first instruction address;

determining, by the processor prior to an execution of the first instruction, a prediction for a taken branch ending the first instruction stream based on the first instruction address and a starting address of a second instruction stream, the prediction being stored in the index accelerator predictor in a table format with the first instruction address being used as an index to determine said prediction;

influencing, by the processor, a metadata prediction engine based on the prediction;

observing, during the execution of the first instruction stream, a taken branch that ends the first instruction stream;

maintaining frequency information based on observations of taken branches that end the first instruction stream, wherein maintaining the frequency information comprises maintaining a separate frequency counter for each of a plurality of taken branches and incrementing a given frequency counter associated with a given taken branch of the plurality of taken branches in response to observing that the given taken branch ends the first instruction stream;

determining, based on the frequency information, an updated prediction for an ending instruction of the first instruction stream, wherein determining the updated prediction comprises replacing a default prediction of a predicted ending instruction with a new prediction of the predicted ending instruction in response to determining that a value of a frequency counter associated with a secondary taken branch of the plurality of taken branches exceeds a value of a frequency counter associated with a default taken branch of the plurality of taken branches; and updating, by the processor, the index accelerator predictor with the updated prediction.

2. The computer-implemented method of claim 1, wherein determining the updated prediction for the ending instruction comprises replacing a prediction for a least frequently observed taken branch with a prediction for a more recently used taken branch that ends the first instruction stream.

3. The computer-implemented method of claim 1, wherein updating comprises increasing a frequency count based on the observed taken branch that ends the first instruction stream.

* * * * *